United States Patent [19]
Kitayama et al.

[11] 4,381,251
[45] Apr. 26, 1983

[54] OXIDATION INHIBITOR

[75] Inventors: Minoru Kitayama; Hisao Odashima, both of Himeji, Japan

[73] Assignee: Nippon Steel Corporation, Tokyo, Japan

[21] Appl. No.: 808,668

[22] Filed: Jun. 21, 1977

[30] Foreign Application Priority Data

Jun. 29, 1976 [JP] Japan .................................. 51-76878
Sep. 10, 1976 [JP] Japan ............................... 51-108591

[51] Int. Cl.$^2$ ............................................ C09K 15/32
[52] U.S. Cl. ................................ 252/400 R; 252/397; 75/96
[58] Field of Search ............... 252/397, 400 R; 75/96, 75/201, 58, 93 R

[56] References Cited

U.S. PATENT DOCUMENTS 3,754,889  8/1973  Dominguez et al. .................. 75/3 X
4,033,762  7/1977  Sato ......................................... 75/96

FOREIGN PATENT DOCUMENTS 1919752 11/1970 Fed. Rep. of Germany .......... 75/96

*Primary Examiner*—Benjamin R. Padgett
*Assistant Examiner*—Josephine L. Barr
*Attorney, Agent, or Firm*—Toren, McGeady and Stanger

[57] ABSTRACT

An oxidation inhibitor comprising;
(A) 10 to 200 parts by weight of at least one selected from the group consisting of
   Silica powder
   Kaoline
   Magnesia powder
   MgO-Cr$_2$O$_3$ refractories
   Mg-SiO$_2$ refractories, and
   Mica
(B) 10 to 200 parts by weight of silicic anhydride (SiO$_2$),
(C) 10 to 200 parts by weight of at least one selected from the group consisting of Cr, Al, Ti, Nb, Ni and Cu in the powder form,
(D) 5 to 50 parts by weight of at least one selected from the group consisting of colloidal silica and alumina sol, and
(E) 1 to 20 parts by weight of water-soluble resin, wherein the ratio of the metal powder to the total solid components is within a range defined by the following formula:

$$\frac{\text{Weight of metal powder}}{\text{Weight of total solid components}} \times 100 = 20\text{--}50\%$$

(the total solid components is the sum of (A)+(B)+(C)+(solid component of D)+(E)).

2 Claims, 6 Drawing Figures

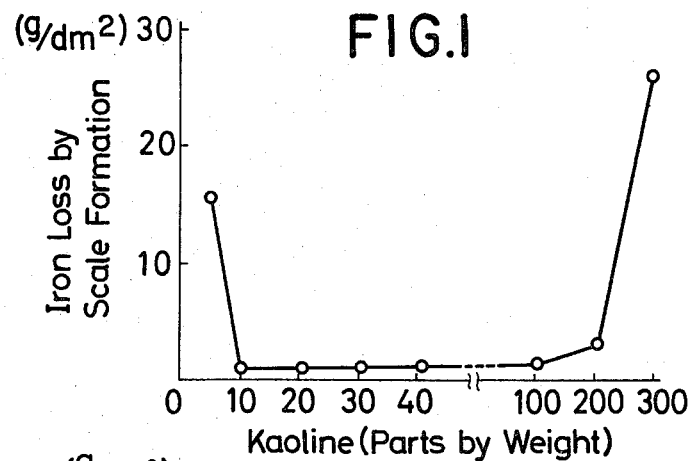
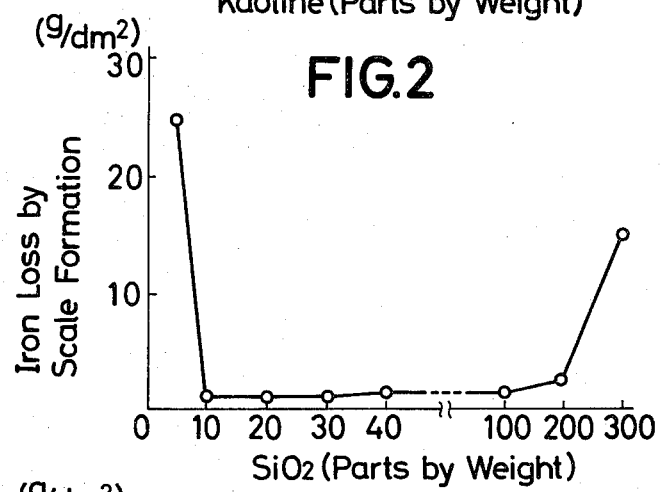
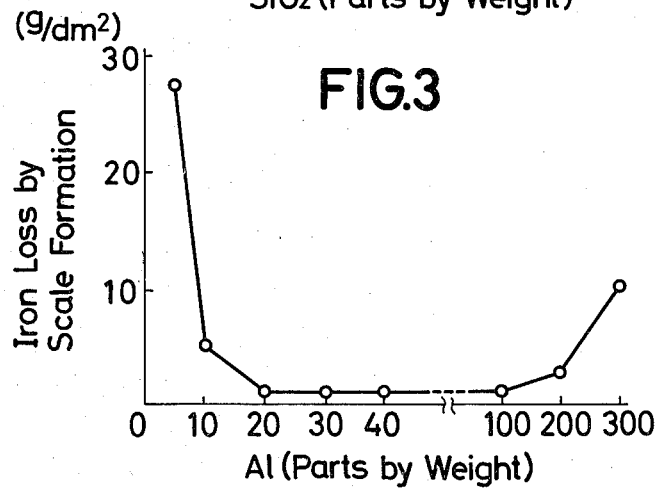

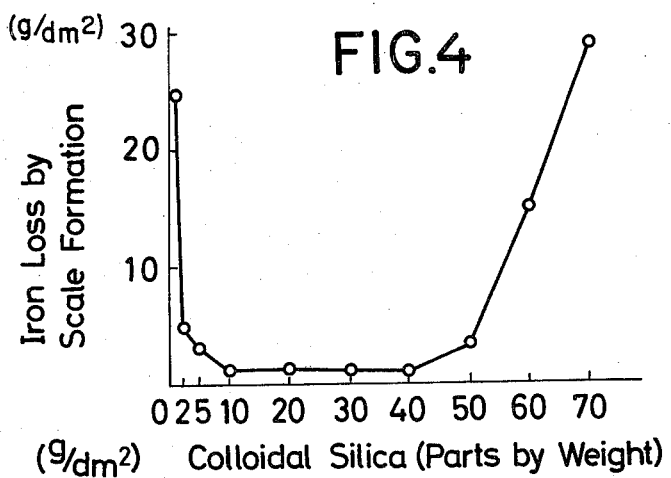
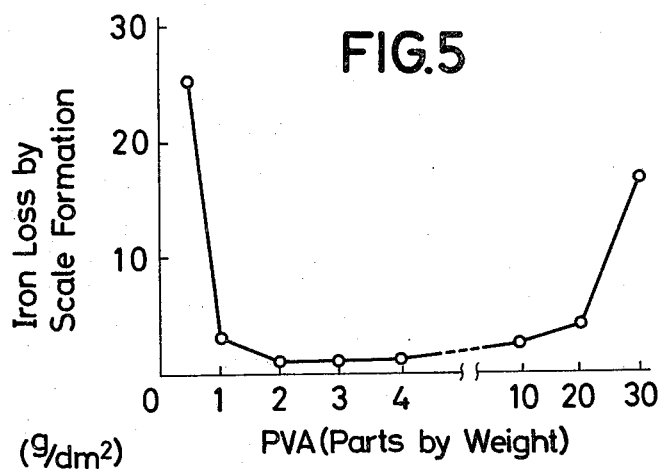
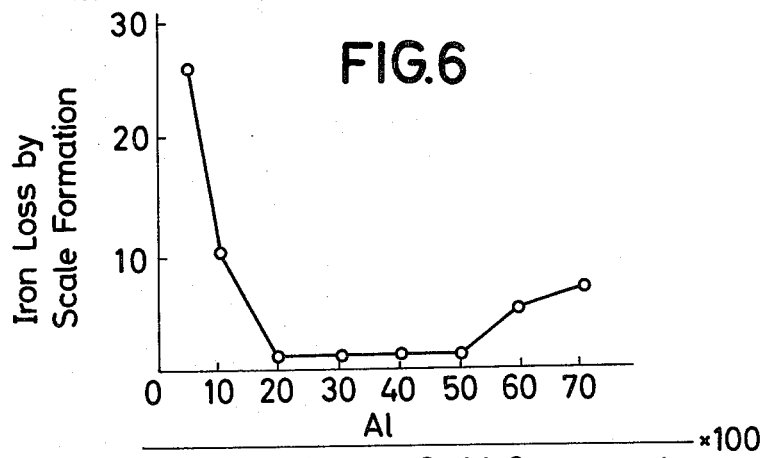

OXIDATION INHIBITOR

BACKGROUND OF THE INVENTION

1. Field of the Invention

The present invention relates to an oxidation inhibitor, particularly useful for preventing scale formation on metal product at high temperatures.

2. Description of the Prior Art

Conventionally, the steel products have been produced according to the following process:

Steel making→ingot making→soaking→breaking-down rolling (slab manufacturing)→surface conditioning→heating→rolling→steel products.

In case where continuous casting is adopted, the slabs are subjected to the following steps:

Surface conditioning→heating→rolling→steel products.

The ingots and the slabs are heated at high temperatures in the soaking furnace and the heating furnace for a long time in the above conventional production processes, so that a large amount of scale is formed during the heating, resulting in considerable lowering of the production yield and causing a great problem from the point of saving the iron source.

In order to overcome the above difficulties and problems, various types of oxidation inhibiting methods have hitherto been proposed and published. Some of these known methods prevent the oxidation by forming a layer of ceramics, glass or the like on the steel surface by baking; others of the methods prevent the oxidation by precipitation of oxide crystals on the metal surface, still others of the methods spray a metal or an inorganic salt having a relatively low melting point on the metal surface and heat the metal or salt, and still further others of them coat the metal surface with a heat-resistant organic substance, or combine these known technics.

By any of these conventional methods, excellent oxidation prevention can be assured at low-temperature zone up to about 800° C., but this excellent oxidation prevention sharply lowers when the temperature exceeds about 1000° C., and in some cases the oxidation inhibitor reacts with Fe of the metal surface, causing dissolution of Fe in the form of $Fe^{++}$ which is hinderous to the oxidation prevention.

Further, in case of flame plating, plasma jet welding, physical and chemical vapour deposition for forming the oxidation inhibiting layer, a treating apparatus of large scale is required and the treating cost is high. Some reports have been published on other methods in which refractories are applied on the steel surface or special chemical treatments are effected.

In general, the oxidation inhibitor is required to have a good removability during a hot rolling as well as an excellent oxidation inhibiting property.

Thus, when the oxidation inhibitor applied on a steel slab, which is then heated and rolled, is entrapped into the slab surface during the hot rolling, it causes surface defects and lowers the commercial value of the product remarkably. Thus it is necessary to remove the oxidation inhibitor as much as possible, preferably completely, by a scale breaker during the hot rolling. No satisfactory oxidation inhibitor has been developed which has both good oxidation preventing property and good removability.

The present inventors have made extensive studies and experiments for development of an oxidation inhibitor having the both excellent oxidation preventing property and good removability as disclosed in Japanese Laid-Open Patent Specification No. Sho 49-30237.

The oxidation inhibitor disclosed in this Japanese Laid-Open Patent Specification can prevent formation of scale almost completely even in case of a high temperature heating above 1000° C., particularly 1200° C. for a long time, and can reduce the scale formation to 1/500–1/1000 of that formed when no treatment with the oxidation inhibitor is done.

However, it has been found that the oxidation inhibitor disclosed in the above Japanese Laid-Open Patent Specification does not always show satisfactory removability when heated above 1300° C. or applied to a special steel grade in spite of its excellent removability in case of an ordinary hot rolling.

Therefore, the present inventors have made various studies and experiments to improve the removability of the oxidation inhibitor during the hot rolling and developed various methods for improving the removability as disclosed in Japanese Laid-Open Patent Specification Nos. Sho 49-43809, Sho 49-63611, Sho 49-73314, Sho 50-5207 and Sho 50-5208.

By combining the oxidation inhibitor disclosed in Japanese Laid-Open Patent Specification No. Sho 49-30237 and the methods just mentioned above, it is possible to apply the oxidation inhibitor to all kinds and types of steel.

For example, this combination will provide the greatest advantage in case of a special steel, such as 9% Ni steels, stainless steels and copper-containing steels, which is very susceptible to intergranular oxidation and selective oxidation due to very slight oxidation, and hence very susceptible to cracking during the hot rolling and surface defects caused by the entrap of hardly-removable scale into the rolled surface.

Meanwhile, in case of ordinary steels which are produced in a large amount, the production cost is low so that oxidation inhibitors used for these ordinary steels are not required to have excellent oxidation prevention as required in case of the special steels, but it is required that they can be produced at a lower cost, with simpler treatments and drying, and have good removability during the hot rolling.

The present inventors have further conducted studies and experiments and have developed an oxidation inhibitor which is advantageous technically and economically for both ordinary steels and special steels.

SUMMARY OF THE INVENTION

The oxidation inhibitors according to the present invention comprises; (A) 10–200, preferably 50–150 parts by weight of at least one selected from the group consisting of silica powder, kaoline, magnesia, montmorillonite, doromite refractories, $MgO\text{-}Cr_2O_3$ refractories, $Mg\text{-}SiO_2$ refractories, and natural and synthetic mica; (B) 10–200, preferably 50–150 parts by weight of silicic anhydride; (C) 10–200, preferably 20–200 parts by weight of at least one selected from the group consisting of Cr, V, Al, Ti, Nb, Ni and Cu in the metal powder form; (D) 5–50, preferably 10–40 parts by weight of at least one selected from the group consisting of colloidal silica and alumina sol (based on the solid), and (D) 1–20, preferably 2–4 parts by weight of water-soluble resin, and satisfies the following condition:

$$\frac{\text{Weight of the metal powder}}{\text{Weight of total solid components}} \times 100 = 20\text{–}50,$$

preferably 30–40% where the total solid components is the total weight of the components (A), (B), (C) and (solid component of D).

According to a modification of the oxidation inhibitor according to the present invention, it further comprises 2–50, preferably 3–10 parts by weight of a synthetic silica compound having the following chemical formula:

$$M_{\frac{1}{3}-1} \cdot X_{2-3} \cdot Si_4O_{10}F_2$$

in which M represents an interlayer ion of Li+, Na+ and Ca2+ having ion exchangeability with an inorganic or organic cation, X represents Mg2+ or Mg2+ partially substituted by Li+.

The metal powders used in the oxidation inhibitor according to the present invention are in the powder form, preferably of 100 to 300 mesh.

The oxidation inhibitors according to the present invention are admixed with an appropriate amount of water to provide a suitable viscosity prior to application onto various metal surfaces for their protection from oxidation.

When the oxidation inhibitor according to the present invention is applied onto a steel material, for example, dried and heated, part of the metal powder component is sintered during the heating and is oxidized by oxygen diffusing through the oxidation inhibitor film to expand its volume, densify the film and prevents further diffusion of oxygen. When the heating is heated in a higher temperature zone, part of the refractories (or clay or mica), silicic anhydride and the colloidal silica or the alumina sol reacts with FeO formed at the intersurface by part of the oxygen diffusing through the film to form a semi-fused film, which provide more effective shielding effect against the environmental air.

When the heating is heated in a still higher temperature zone or for a long time, the semi-fused film gets flowability to promote the diffusion of Fe and O and dissolution of Fe in case of a conventional oxidation inhibitor.

However, in case of the oxidation inhibitor according to the present invention, as the film itself is densified by the oxidation of the metal powder component, the fusion of the film proceeds only partially and does not proceed any further, and the presence of the oxides formed by the oxidation of the metal powder components improves the refractoriness of the film so that the film does not fluidize under severe heating conditions, and thus there is caused no dissolution of Fe and excellent oxidation inhibition can be assured.

According to the modification of the present invention, a synthetic scale-like silicate compounds is added to the basic composition as mentioned hereinbefore. The addition of the synthetic scale-like silicate compound is effective to improve considerably the strength of the oxidation inhibiting film formed on the steel surface at higher temperatures during the heating step, whereby particularly when the steel slab is heated in a continuous heating furnace, the film can avoid surface defects such as scratches by the skid and the furnace bottom, and thus more complete scale prevention can be achieved.

Further, the addition of the synthetic silicate compound permits the film to show a maximum expansion rate of about 5%, as compared with about 1% when no synthetic silicate compound is added, and this means the addition produces a film more brittle when exposed to the thermal impact.

Thus the oxidation inhibiting film formed with the addition of the synthetic silicate compound can be removed more readily and completely from the steel slab after the heating by means of a mechanical removing means such as a scale breaker (RSB) with a high pressure water having 50 to 30 atmospheric pressure in the hot rolling process for example. Without the addition of the synthetic silicate compound, the film will require a high-pressure water having 100 or more atmospheric pressure for its complete removal from the steel slab after heating.

The easiness in removing the film entailed by the addition of the synthetic silicate compound can, in turn, afford lowered power consumption by the scale breaker.

As compared with the conventional oxidation inhibitors, the oxidation inhibitor according to the present invention provides satisfactory oxidation inhibiting effect with a very small amount of application on the metal surface, so that almost no drying is required and the treatment cost is very low.

For example, when 0.2 kg/m2 of the oxidation inhibitor according to the present invention is applied on a steel material and heated, the scale formation can be lowered to 1/100 to 1/200. Simultaneously, with satisfactory removability during the hot rolling, no special treatment is required for improving their removability. This removability is still further improved by addition of the synthetic silicate compound.

According to the present invention, the required amount of the oxidation inhibitor to be applied is so small that no drying is required, and that it does not hinder the heating of the steel material and thus excessive heating energy consumption is saved for the heating.

Further, the film formed by the oxidation inhibitor, modified with addition of the synthetic silicate compound, shows a higher degree of strength during the heating of the steel material, so that the film does not peel off substantially, even when the steel material is heated in a continuous heating furnace and hen the steel material is scratched partially by the furnace skid, a sound film is maintained on the under side of the steel material.

Therefore, the oxidation inhibitor according to the present invention is advantageous for ordinary low-cost steels because it can be manufactured and treated at very low cost.

Also the oxidation inhibition according to the present invention can be satisfactorily applied to special steels, such as 9% Ni steels, stainless steels and copper-containing steels.

Now, descriptions will be made on the components of the oxidation inhibitors according to the present invention.

The oxidation inhibitor according to the present invention is composed basically of—refractories (or clay or mica)—silica, metal powders—colloidal silica or alumina sol—and water soluble resin.

According to the modification of the present invention, a synthetic silicate compound is added to the above basic composition.

As for the refractories (or clay or mica) silica powder, kaolline or chamotte, magnesia powder, montmorillonite, dolomite, MgO-Cr$_2$O$_3$, Mg-SiO$_2$ and mica (natural or synthetic) are all effective when added in single or in combination. However, kaolline and montmorillonite are more useful than the others.

As for SiO$_2$ used in the present invention it should be a stable and precipitating silicic anhydride and unstable SiO$_2$, such as partially hydrated SiO$_2$ or the like, is apt to form firelite and thus undesirable. Regarding the colloidal silica or alumina sol, acidic or alkaline colloidal silica or alumina sol may be used so far as it is stable.

As for the water soluble resin which is added for increasing the viscosity and promoting the film formation, any type of water soluble resin may be used.

As for the synthetic silicate compound having the general formula of

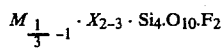

as defined hereinbefore, it can be defined as one type of the commonly so-called hectolite mineral, and any synthetic silicate compound having the above chemical formula may be used. For example, the interlayer ion may be substituted by (H$_3$O)$^+$, K$^+$, NH$_4^+$, Ca$^{2+}$, Mg$^{2+}$, Si$^{2+}$, Sn$^{2+}$, Zn$^{2+}$, Fe$^{2+}$, Al$^{3+}$, Sb$^{2+}$ and Bi$^{3+}$, or may be substituted by an organic cation such as β-alamin, cationated alkylamine, and a chelate compound of a transient metal.

The present invention will be more clearly understood from the following descriptions referring to the attached drawings.

BRIEF EXPLANATION OF THE DRAWINGS

FIG. 1 is a graph showing the iron loss caused by scale formation when an oxidation inhibitor composed of 100 parts by weight of SiO$_2$, 70 parts by weight of Al powder, 30 parts by weight of colloidal silica and 5 parts by weight of PVA is used.

FIG. 2 is a graph showing the iron loss caused by scale formation when an oxidation inhibitor composed of 100 parts by weight of kaoline, 70 parts by weight of Al powder, 30 parts by weight of colloidal silica and 5 parts by weight of PVA is used.

FIG. 3 is a graph showing the iron loss caused by scale formation when an oxidation inhibitor composed of 100 parts by weight of kaoline, 100 parts of SiO$_2$, 30 parts by weight of colloidal silica, and 5 parts by weight of PVA is used.

FIG. 4 is a graph showing the iron loss caused by scale formation when an oxidation inhibitor composed of 100 parts by weight of kaoline, 100 parts by weight of SiO$_2$, 70 parts by weight of Al powders, and 5 parts by weight of PVA is used.

FIG. 5 is a graph showing the iron loss caused by scale formation when an oxidation inhibitor composed of 100 parts by weight of kaoline, 100 parts by weight of SiO$_2$, 70 parts by weight of Al powder, and 30 parts by weight of colloidal silica is used.

FIG. 6 is a graph showing the relation between the iron loss by the scale formation and the ratio of the metal powder content to the total solid components and these graphs are based on the results obtained by applying the oxidation inhibitor with various contents of components and various ratios of the metal powder content to the total solid content onto a steel material, and heating at 1300° C. for 3 hours, and measuring the iron loss by the scale formation to determine an optimum range for each component and the ratio of the metal powder content to the total solid content.

As understood from the results shown in the FIGS. 1–6, the preferable ranges for individual components of the oxidation inhibitor according to the present invention are as below:
Chamotte or kaoline: 10–200 parts by weight
Silicic anhydride (SiO$_2$): 10–200 parts by weight
Al powder: 10–200 parts by weight
Colloidal silica (solid): 2–50 parts by weight
Water soluble resin (sodium polyacrylate or PVA): 1–20 parts by weight and optionally
synthetic silicate compound: 2–50 parts by weight
and the preferable range for the ratio of the metal powder to the total solid components is 20 to 50%.

For the measurement of the iron loss by the scale formation is done by the following procedures.

The oxidation inhibitor is peeled off from the steel surface after the heating by giving impact thereto, and the steel is electrolized as cathode in 10% HCl solution at Dk of 1.5 A/dm$^2$ for one hour to remove the scale by cathodic reduction, and the iron loss by the scale is determined by subtracting the weight of the steel after the electrolytic reduction from the weight of the steel before the application of the oxidation inhibitor.

Similar results as those shown in FIG. 1 to FIG. 6 can be obtained by substituting the chamotte by one or more of silica powder, magnesia powder, montmorillonite, doromite, MgO-Cr$_2$O$_3$ refractory, Mg-SiO$_2$ refractory and kaoline, by substituting Al powder by one or more of Cr, V, Ti, Nb, Ni and Cu in the powder form, by substituting the colloidal silica by alumina sol or alumina sol and colloidal silica, and by substituting PVA by other water-soluble resins such as sodium polyacrylate.

Based on the above results, the basic composition of the oxidation inhibition according to the present invention is defined below.

(A) 10 to 200, preferably 50 to 150, parts by weight of at least one selected from the group consisting of silica powder, kaoline, magnesia powder, MgO-Cr$_2$O$_3$ refractories, Mg-SiO$_2$ refractories, and mica, (B) 10 to 200, preferably 50 to 150, parts by weight of silicic anhydride (SiO$_2$), (C) 10 to 200, preferably 20 to 200, parts by weight of at least one selected from the group consisting of Cr, V, Al, Ti, Nb, Ni and Cu in the powder form, (D) 2 to 50, preferably 10 to 40, parts by weight of at least one selected from the group consisting of colloidal silica and alumina sol, (E) 1 to 20, preferably 2 to 4, parts by weight of water-soluble resin, wherein the ratio of the metal powder to the total solid component (A+B+C+solid component of D) is 20 to 50%, preferably 30 to 40%, and (F) the content of the synthetic silicate compound as an optional component is defined as 2 to 50, preferably 30 to 40, parts by weight.

Below 2 parts by weight, no further desired improvements can be obtained, and on the other hand, beyond 50 parts by weight the oxidation inhibiting effect will be lowered. The ratio of the metal powder to the total solid component is maintained in the range from 20 to 50%, preferably 30 to 40% also when the synthetic silicate compound is added. In this case the total solid component is the sum of (A)+(B)+(C)+(solid component of D)+(F).

As clearly understood from the results shown above, the oxidation inhibitor according to the present invention shows satisfactory oxidation inhibiting effect for all kinds and types of steels including 9%-Ni steels, stainless steels and copper-containing steels as well as ordinary steels. For example, the oxidation inhibitor according to the present invention can reduce the scale formation to about 1/200 of that formed when the steel is heated at 1250° C. for 2.5 hours without an oxidation inhibitor according to the present invention. This oxidation inhibiting effect is remarkable when compared with that obtained by conventional similar inhibitors, and the difference increases more remarkably when the heating temperature increases.

For further improving the refractoriness of the oxidation inhibitor according to the present invention, various other ceramics may be added to the basic composition as defined hereinbefore. However, such addition of additional refractories is normally unnecessary in applications where it is exposed to temperatures lower than 1400° C.

The oxidation inhibitor composition, when applied on the steel surface and heated, produces a strong film of high strength which can stand against some mechanical force imposed thereon and is not damaged or stripped off thereby, and thus can stand against the handling in a continuous heating furnace.

Thus, the film formed from the oxidation inhibitor composition according to the present invention can be maintained satisfactorily even at the portions such as the under and side surfaces of the slab, contacting the furnace skid or contacting the adjacent slabs and prevent the oxidation satisfactorily.

Further, the oxidation inhibitor composition according to the present invention produces a coating which can be readily removed during the hot rolling step and thus avoid the so-called "brick scratches" which are caused by the entrapment of the coating between the rolls and the steel material during the hot rolling. The coating produced from the oxidation inhibitor composition according to the present invention is very fragile to the thermal shock and it can be removed completely (100%) and very easily by a scale breaker in the hot rolling step.

Further, the oxidation inhibitor composition according to the present invention, when applied on the steel surface, can effectively prevent the scale formation so that it can avoid "scale scratches" satisfactorily and assures a very good surfacial condition after the rolling.

Still further, as a binder used for the oxidation inhibitor composition used in the present invention, chiefly a water-soluble resin is used so that the drying is simple, and can be dried for a short time when left in the air without any special drying means, and the drying time can be shortened by increasing the temperature of the coating bath.

The oxidation inhibitor composition according to the present invention can be produced at a considerably lower cost, and produce the desired results when applied in a small amount (0.1 kg/m$^2$ or more) so that no substantial cost increase is caused by heating the composition applied on the steel surface.

According to the prior art as disclosed in the Japanese Laid-Open Patent Specification Sho 49-30237, it also discloses a metal powder contained in the composition. However, the mechanism of oxidation inhibition in this prior art is based on the following facts. The film of water glass contained in the composition gives excellent oxidation inhibiting effects, in a low temperature zone (about 500° C. or lower) and in a middle temperature zone (about 500° to about 1000° C.) the metal powder contained in the film catches and combines with $O_2$ diffusing through the film to prevent further advance of $O_2$ into the inside of the film, thus preventing the oxidation of the steel surface satisfactorily.

In a still higher temperature zone (1000° C. or higher), a special semi-fused film is formed by $Na_2O$ in the water glass and $SiO_2$ and $CR_2O_3$ contained in the coating film, and every excellent oxidation inhibiting effect is produced thereby.

Thus, in the prior art, the reducing agent (chiefly the metal powder) is added for the purpose of increasing the oxidation inhibiting effect in the middle temperature zone, and the amount of the reducing agent is relatively small such as 1 to 20 parts by weight, practically about 10% to the total solid components as illustrated in the examples.

The most essential feature of the prior art of Japanese Laid-Open Patent Specification Sho 49-30237, lies in that the special semi-fused film is produced by a specific combination of $Na_2O$ in the water glass and $SiO_2$ and $Cr_2O_3$ in the film, and this semi-fused film prevents almost completely diffusion of oxygen into the film from the outside, thus assuring very excellent oxidation inhibiting effect.

Whereas, the most essential features of the present invention lie in that the metal powder is admixed in an amount from 10 to 200 parts by weight, and the ratio of the metal powder component to the total solid components is maintained in a range from 20 to 50%.

When the oxidation inhibitor composition according to the present invention is applied on the surfaces of various steels and heated, $O_2$ defusing through the film thus formed combines with the metal powder and the metal powder expands in its volume by the oxidation and densifies the film with simultaneous prevention the defusion of $O_2$ into the film to some degrees. The film thus densified can produce excellent oxidation inhibiting effect.

Therefore, in the prior art as disclosed by Japanese Laid-Open Patent Specification, as the film is semi-fused, it readily reacts with the steel material and very often deteriorates the removability of the film during the hot rolling.

Whereas in the present invention, the film is not semi-fused so that it does not react with the steel material, thus assuring very excellent removability of the film during the hot rolling and considerably increased strength of the film during the heating.

Thus, the present invention is completely different from the prior art of Japanese Laid-Open Patent Specification Sho 49-30237 with respect to the content and functions of the metal powder and the water glass which is not used in the present invention.

DESCRIPTION OF PREFERRED EMBODIMENTS

The present invention will be more clearly understood from the following embodiments.

EXAMPLE 1

The oxidation inhibitor composition was prepared by admixing:

| kaoline | 100 parts by weight |
| --- | --- |
| SiO$_2$ | 100 parts by weight |
| Al powder | 70 parts by weight |
| 20% colloidal silica | 20 parts by weight |
| polyacrylic acid | 3 parts by weight |
| water | 75 parts by weight |

Thus, the percentage of the metal powder to the total solid component in the above composition was:

$$\frac{70(Al)}{100(kaoline) + 100(SiO_2) + 70(Al) + 4(colloidal\ silica \ldots 20 \times 0.2)} \times 100 = 25.5\%$$

The above composition was applied on the surface of an ordinary steel slab in an amount of 0.2 kg/m$^2$, left at ordinary temperature, and the slab thus coated is heated at 1250° C. for 3 hours, and rolled. The oxidation inhibiting coating was removed completely (100%) when the coated slab passed through the scale breaker with a high-pressure water of 150 atmospheric pressure (atm.), and the steel sheet after the rolling showed no surface defect, and measurements of the weight of the rolled product indicated a yield of 99.99%, whereas, the steel sheet rolled under the same condition but using no oxidation inhibiting composition showed a yield of 98.5%, and the surface had scabs due to the scale entrapment during the rolling.

EXAMPLE 2

The oxidation inhibitor composition was prepared by mixing:

| chamotte | 100 parts by weight |
| --- | --- |
| SiO$_2$ | 150 parts by weight |
| Si powder | 100 parts by weight |
| 10% alumina sol | 30 parts by weight |
| PVA | 3 parts by weight |
| water | 80 parts by weight |

Thus, the percentage of the metal powder to the total solid component was:

$$\frac{100(Si)}{100(chamotte) + 150(SiO_2) + 100(Si) + 3(colloidal\ silica \ldots 30 \times 0.1)} \times 100 = 28\%$$

The above composition was applied on the surface of a steel slab in an amount of 0.2 kg/m$^2$, left at ordinary temperature, and the steel slab thus coated was heated at 1270° C. for 2.5 hours and rolled.

The oxidation inhibiting coating was removed completely (100%) when the coated steel slab passed through the scale breaker with a high-pressure water of 100 atm. and the steel after the rolling showed a surface completely free from the surface defects, and measurements of the weight of the rolled product indicated a yield of 99.99% whereas, the steel sheet obtained by rolling under the same condition but using no oxidation inhibitor composition showed a yield of 98.2%, and visual observations of the surface revealed local surface defects due to the scale entrapment during the rolling.

EXAMPLE 3

The oxidation inhibitor composition was prepared by mixing:

| Montmorillonite | 50 parts by weight |
| --- | --- |
| SiO$_2$ | 100 parts by weight |
| Ni powder | 50 parts by weight |
| 20% colloidal silica solution | 30 parts by weight |
| sodium polyacrylate | 10 parts by weight |
| water | 90 parts by weight |

Thus, the percentage of the metal powder to the total solid components was:

$$\frac{50(Ni)}{50(mont.) + 100(SiO_2) + 50(Ni) + 6(colloidal\ silica \ldots 30 \times 0.2)} \times 100 = 24\%$$

The above composition was applied on the surface of a 9%-Ni steel slab in an amount of 1.0 kg/m$^2$, dried with a warm air blast, and the steel slab thus coated was heated at 1230° C. for 3 hours and rolled.

The oxidation inhibitor coating on the steel slab was removed completely (100%) from the slab surface when the slab passed through the scale breaker with a high-pressure water of 150 atm., and the steel sheet after the rolling had a surface completely free from surface defects, and measurements of the weight of the rolled product indicated a yield of 99.99%. Whereas, steel sheets obtained by rolling under the same conditions, but using no oxidation inhibitor composition showed a yield of 98.7% and had surfaces with effects scattered all over the whole surface due to the scale entrapment during the rolling, and required grinding over the whole surfaces.

EXAMPLE 4

The oxidation inhibitor composition was prepared by mixing:

| chamotte | 100 parts by weight |
| --- | --- |
| SiO$_2$ | 100 parts by weight |
| Al powder | 120 parts by weight |
| colloidal silica (solid) | 5 parts by weight |
| synthetic silicate compounds (Na $\frac{1}{3}$.Mg 2$\frac{2}{3}$.Li $\frac{1}{3}$(Si$_4$O$_{10}$)F$_2$) | 5 parts by weight |
| sodium polyacrylate | 3 parts by weight |
| water | some |

Thus, the ratio of the metal powder to the total solid components was 36.3%.

EXAMPLE 5

The oxidation inhibitor composition was prepared by mixing:

| kaoline | 80 parts by weight |
| --- | --- |
| SiO$_2$ | 120 parts by weight |
| Al powder | 100 parts by weight |
| colloidal silica | 10 parts by weight |

-continued

| | |
|---|---|
| synthetic silicate compound $(Na_{\frac{1}{3}}\cdot Mg_{2\frac{2}{3}}\cdot Li_{\frac{1}{3}}(Si_4O_{10})F_2)$ | 10 parts by weight |
| polyacrylate acid | 5 parts by weight |
| water | some |

Thus, the ratio of the metal powder to the total solid components was 31.2%.

EXAMPLE 6

The oxidation inhibitor composition was prepared by mixing:

| | |
|---|---|
| dolomite | 50 parts by weight |
| SiO$_2$ | 150 parts by weight |
| Ni powder | 100 parts by weight |
| colloidal silica (solid) | 10 parts by weight |
| synthetic silicate compound | 20 parts by weight |
| PVA | 10 parts by weight |
| water | some |

Thus, the ratio of the metal powder to the total solid component was 30.3%.

The oxidation inhibitor compositions prepared in Examples 4, 5 and 6 were applied on various steels in amounts of 0.3 kg/m$^2$, 0.5 kg/m$^2$ and 0.7 kg/m$^2$ respectively, and the coated steels were treated in a similar way as in Example 1, and similar results were obtained as in Examples 1-3 with still improved removability of the film; thus similar removability (100%) was obtained with lower water pressures such as 30 to 50 atm.

What is claimed is:

1. An oxidation inhibitor comprising:
   (A) 10 to 200 parts by weight of at least one selected from the group consisting of
   Silica powder
   Kaoline
   Magnesia powder
   MgO-Cr$_2$O$_3$ refractories
   Mg-SiO$_2$ refractories, and
   Mica
   (B) 10 to 200 parts by weight of silicic anhydride (SiO$_2$),
   (C) 10 to 200 parts by weight of at least one selected from the group consisting of Cr, V, Al, Ti, Nb, Ni and Cu in the powder form,
   (D) 5 to 50 parts by weight of at least one selected from the group consisting of colloidal silica and alumina sol, and
   (E) 1 to 20 parts by weight of water-soluble resin,
   wherein the ratio of the metal powder to the total solid components is within a range defined by the following formula:

$$\frac{\text{Weight of metal powder}}{\text{Weight of total solid components}} \times 100 = 20\text{--}50\%$$

(the total solid components is the sum of (A)+(B)+(C)+(solid component of D)+(E)).

2. An oxidation inhibitor composition according to claim 1, which further comprises 2 to 50 parts by weight of (F) a synthetic silicate compound having a general formula of

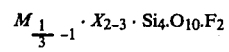

in which M represents interlayer ions such as Li$^+$, Na$^+$, Ca$^{2+}$ which are ion exchangeable with an inorganic cation and an organic cation,
wherein the ratio of the metal powder to the total solid components (A+B+C+solid component of D and F) is 20 to 50%.

* * * * *